United States Patent Office 3,047,572
Patented July 31, 1962

3,047,572
DIMETHYLAMINOPHENOTHIAZINE DERIVATIVES
Paul N. Craig, Roslyn, Pa., assignor to Smith Kline & French Laboratories, Philadelphia, Pa., a corporation of Pennsylvania
No Drawing. Filed Dec. 10, 1958, Ser. No. 779,288
6 Claims. (Cl. 260—243)

This invention relates to new dimethylaminophenothiazine derivatives which are therapeutically active compounds.

The new compounds of this invention have utility as pharmacodynamically active agents. More specifically, these compounds are useful as tranquilizers, calmatives, antiemetics and general central nervous system depressants.

The dimethylamino substituted phenothiazines of this invention are represented by the general formula:

Formula I

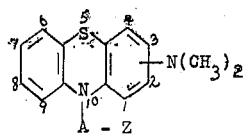

when:

A represents a divalent, saturated straight or branched alkylene chain containing from 2 to 4 carbon atoms, separating the two nitrogens to which it is attached by at least 2 carbons preferably propylene or methyl propylene; and Z represents a moiety attached to the alkylene chain through a nitrogen atom such as dimethylamino, diethylamino, N-formylpiperazinyl, piperazinyl, N-methylpiperazinyl, N-hydroxyethylpiperazinyl, N-acetoxyethylpiperazinyl, N-hydroxyethoxyethylpiperazinyl, N-pyrrolidinyl, N-p-nitrophenethylpiperazinyl and N-p-aminophenethylpiperazinyl.

The dimethylamino moiety is preferably substituted in the 2-position of the phenothiazine nucleus.

An advantageous compound of this invention is 10-(3'-dimethylaminopropyl) - 2 - dimethylaminophenothiazine.

This invention includes nontoxic pharmaceutically acceptable salts of the above defined bases. Depending upon the available basic moieties present and the number of acid equivalents used, a mono or poly acid addition salt is formed. Also included in this invention are the pharmaceutically acceptable salts of the novel intermediate, 2-dimethylaminophenothiazine. Such salts are easily prepared by methods known to the art. The base is reacted with the calculated amount of either organic or inorganic acid in an aqueous-miscible solvent such as acetone or ethanol, with isolation of the salt by concentration and cooling; or an excess of the acid in an aqueous-immiscible solvent, such as ethyl ether or chloroform, with the desired salt separating directly. Exemplary of such organic salts are those with maleic, fumaric, benzoic, ascorbic, pamoic, succinic, bis-methylenesalicyclic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids, as well as with the 8-halotheophyllines, for example 8-chlorotheophylline and 8-bromotheophylline. Exemplary of such inorganic salts are those with hydrochloric, hydrobromic, sulfuric, sulfamic, phosphoric and nitric acids. These salts may also be prepared by the classical method of double decomposition of appropriate salts which is well-known to the art.

The novel 2-dimethylaminophenothiazine useful as an intermediate in the preparation of the compounds of Formula I and a part of this invention is represented by the following formula:

Formula II

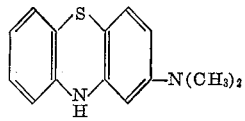

The compounds of this invention are prepared from 4-bromo-3-nitro-dimethylaniline according to the following synthetic procedure:

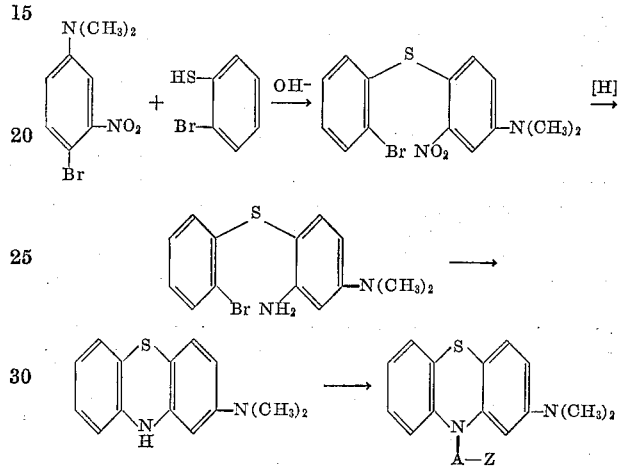

The following general procedure is used to prepare the dimethylamino substituted phenothiazines of this invention. This method is carried out using readily available starting materials and gives good yields of the end product.

A stirred refluxing solution of 4-bromo-3-nitro-dimethylaniline in ethanol is condensed with o-bromothiophenol under alkaline conditions to give 2'-bromo-2-nitro-4-dimethylaminodiphenylsulfide. The nitro group on the 2 position is then reduced with stannous chloride-hydrochloric acid to give 2'-bromo-2-amino-4-dimethylaminodiphenylsulfide. Ring closure is accomplished by heating at reflux the 2'-bromo-2-amino-4-dimethylaminodiphenylsulfide in the presence of an acid binding agent. Exemplary of such acid binding agents are the alkali metal carbonates, such as sodium carbonate, copper carbonate, sodium bicarbonate or prefereably potassium carbonate. The reaction is run in a suitable nonreactive organic solvent in which the reactants are at least partially soluble. Exemplary are dioxane, dimethylaniline, diethylformamide, methylformamide, dimethylformamide or dimethylacetamide. Preferably, the solvent is dimethylformamide and other similar low-carbon amides. Optimum yields are obtained when catalytic amounts of copper bronze powder or cuprous iodide are added. Ring closure of the 2'-bromo-2-amino-4-dimethylaminodiphenylsulfide as described above, yields 2-dimethylaminophenothiazine.

The 2-dimethylaminophenothiazine, Formula II, is condensed under a nitrogen atmosphere with a reactive tertiary aminoalkyl ester to form the 10-aminoalkyldimethylaminophenothiazine of Formula I. Any reactive tertiary aminoalkyl ester containing the desired A–Z moiety may be used, such as the halides preferably bromide or chloride, or the sulfonic esters, preferably p-toluene sulfonate. The condensation is preferably carried out at a temperature in the range of from about 30° C. to about 160° C. The condensation is carried out advantageously by refluxing the reactants in an inert aromatic solvent such as, preferably, benzene, toluene or xylene in which at least one of the reactants must be soluble. A suitable acid binding agent is usually included, such as an alkali metal amide, preferably sodium, potassium or lithium amide. Other acid-binding agents are alkali metal hydride, preferably sodium hydride or alkali metal aryl or alkyl compounds, preferably phenyl or octyl sodium. If the acid addition salt of the reactive ester or phenothiazine is used, a corresponding increase in acid binding agent must be used.

The preferred method of alkylation, however, is to react dimethylaminophenothiazine with an aminoalkyl chloride or bromide with a slight excess of sodium or potassium amide in refluxing benzene, toluene or xylene for from about 30 minutes to about 36 hours, preferably 3 to 8 hours. The substituted dimethylaminophenothiazine is isolated by adding an excess of water to the cooled reaction mixture. The organic layers are extracted with dilute acid, preferably dilute acetic acid. The acid extracts are combined, neutralized and extracted with benzene. The extracts are distilled under vacuum and the finished product obtained usually as an oil.

The 10-(ω-piperazinylalkyl) - 2 - dimethylaminophenothiazines are prepared by alkylating dimethylaminophenothiazine with a ω-haloalkylpiperazine with the free N-hydrogen of the piperazinyl moiety protected by, for example, a benzyl, carbobenzoxy or acyl, preferably a formyl or carbethoxy group. The N-protective group is then removed by mild hydrolysis. The resulting 10-(ω-piperazinylalkyl-2-dimethylaminophenothiazine may then be further alkylated to form various modifications of Formula I. Such methods of alkylation are by a reactive ester such as alkyl halide in the presence of an acid binding agent in inert solution such as benzene or butanone, by reaction with an alkylene oxide such as ethylene oxide in alcohol, or by alkylation with a halogenated alcohol such as bromoethanol in the presence of an acid binding agent, for example potassium carbonate.

It will be readily apparent to one skilled in the art that variations of these procedures are possible. The preferable preparative procedures are the methods disclosed above, most advantageously, N-alkylation of the dimethylaminophenothiazine in the 10 position of the nucleus by a reactive ester.

It will also be readily apparent to one skilled in the art that certain of the compounds of this invention notably those in which A is represented by a branched aliphatic carbon chain so that an asymmetric carbon atom is formed, may be present as optical isomers. The connotation of the general formulae presented herein is to include all isomers, particularly the separated $d$ or $l$ optical isomers as well as the $dl$ mixture of these isomers. If desired, the isomers may be separated for individual use by separation methods known to the art, such as fractional crystallization; for instance, of the $d$-tartrate salts of the 10-aminoalkylated 2-dimethylaminophenothiazine derivatives. Alternatively, a synthesis starting with an optically active side chain may yield the desired optical isomer.

The procedures outlined above are not limiting to the dimethylaminophenothiazine derivatives but as is readily apparent to one skilled in the art, any di-lower alkylaminophenothiazine, preferably those having lower alkyl group not in excess of 4 carbon atoms, can be prepared.

The following examples are illustrative of compounds of this invention and the procedures for their preparation.

*Example 1*

A stirred refluxing solution consisting of 84 g. of 4-bromo-3-nitrodimethylaniline in 600 ml. of ethanol is treated dropwise with an aqueous ethanolic solution of sodium o-bromothiophenol which is prepared by dissolving 57 g. of o-bromothiophenol in 300 ml. of ethanol and adding 12 g. of sodium hydroxide in 20 ml. of water. Stirring and refluxing of the solution is continued for 20 hours. The solution is then treated with Norit and filtered. The filtrate is cooled and the resulting crystals are recrystallized from ethanol yielding 2'-bromo-2-nitro-4-dimethylaminodiphenylsulfide as yellow crystals with a melting point of 120–121° C.

To a stirred solution of 235 g. of stannous chloride dihydrate in 690 ml. of concentrated hydrochloric acid is added in portions, 91.9 g. of 2'-bromo-2-nitro-4-dimethylaminodiphenylsulfide. The white suspension is refluxed for 4 hours and then diluted with water and made alkaline with sodium hydroxide solution. A solid which forms on cooling is collected, dried in vacuo and extracted with hot benzene. Dilution with petroleum ether gives 2'-bromo-2-amino-4-dimethylaminodiphenylsulfide as white crystals with a melting point of 126–127° C.

A mixture of 49.5 g. of 2'-bromo-2-amino-4-dimethylaminodiphenylsulfide, 28.8 g. of anhydrous granular potassium carbonate, 8 g. of cuprous iodide and 2.88 g. of copper bronze powder is stirred and refluxed in 500 ml. of dimethylformamide for 21 hours under a slow steam of pre-purified nitrogen. There is no further indication of $CO_2$ evolution after this time. The mixture is filtered and the filtrate diluted with water. The light purple precipitate is collected and dried in vacuo at 100° C. Recrystallization from benzene with a Norit treatment yields 2-dimethylaminophenothiazine as microscopic white needles with a melting point of 157–158° C.

Treating a sample of the free base in ether solution with an excess of anhydrous hydrogen bromide gas yields the hydrobromide salt.

*Example 2*

To a solution of 19.5 g. of 2-dimethylaminophenothiazine (as prepared in Example 1) in 700 ml. of dry xylene is added 4.0 g. of sodamide. The mixture is stirred and refluxed under nitrogen atmosphere for 80 minutes. A solution of 12.4 g. of 3-chloro-1-dimethylaminopropane in 50 ml. of dry xylene is added. The mixture is refluxed and stirred under a nitrogen atmosphere for six hours. After cooling add 200 ml. of water and extract the xylene layer with acetic acid. The combined acid extracts are neutralized with ammonium hydroxide and the product taken up in benzene. The benzene extracts are combined and the solvent evaporated. The residue is distilled at 215–220° C./0.3–0.5 mm. to give 10-(-3'-dimethylaminopropyl)-2-dimethylaminophenothiazine.

The amine is dissolved in dry ether and treated with a solution of isopropanol containing 2 equivalent amounts of hydrogen chloride. The precipitated dihydrochloride salt is recrystallized from benzene-methanol and melts at 214–215° C.

*Example 3*

A suspension of 24.2 g. of 2-dimethylaminophenothiazine (as prepared in Example 1) and 2.4 g. of lithium amide in 100 ml. of dry toluene is stirred, slowly heated to reflux temperature and refluxed for one hour under nitrogen atmosphere. A solution of 16.3 g. of 2-chloro-1-diethylaminopropane in 25 ml. of toluene is added slowly and the resulting mixture refluxed under a nitrogen atmosphere for seven hours. The excess lithium amide is decomposed by cautiously adding 50 ml. of water. The reaction mixture is then extracted with dilute acetic acid and the acidic extracts neutralized with aqueous ammonia and subjected to a benzene extraction. The solvent is distilled off in vacuo leaving the residual 10-(diethylaminoisopropyl) - 2 - dimethylaminophenothiazine.. Treating the oil with excess maleic acid in ethyl acetate results in the formation of the maleate salt.

*Example 4*

A suspension of 48.4 g. of 2-dimethylaminophenothiazine (as prepared in Example 1) and 8.3 g. of sodamide in 500 ml. of xylene is stirred and heated at reflux for 90 minutes under nitrogen atmosphere. A solution of 41.8 g. of 3-chloro-2-methyl-1-(N-methylpiperazinyl)-propane in 100 ml. of xylene is added and refluxing continued for five hours under nitrogen atmosphere. The cooled reaction mixture is treated with 100 ml. of water and the xylene layer extracted with dilute acetic acid. The combined acid extracts are neutralized with ammonium hydroxide and the product taken up in benzene. The benzene is evaporated in vacuo and the resultant oil is 10-[2'-methyl-1'-(N-methylpiperazinyl)-propyl] 2-dimethylaminophenothiazine.

Treating a sample of the free base in ether solution with excess anhydrous hydrogen bromide yields the corresponding hydrobromide salt.

*Example 5*

To a solution of 12.1 g. of 2-dimethylaminophenothiazine in 500 ml. of dry xylene is added 1.2 g. of lithium amide and the mixture is refluxed under nitrogen atmosphere for two hours. A solution of 10.4 g. of 1-formyl-4-(3-chloropropyl)-piperazine in 100 ml. of dry xylene is added and refluxing under a nitrogen atmosphere is continued for five hours. Water is added to the reaction mixture and the separated xylene layer is extracted with dilute acetic acid. The acid extracts are neutralized with ammonia and extracted with benzene. The solvent is distilled in vacuo leaving 10-[-3'-(N-formylpiperazinyl)-propyl]-2-dimethylaminophenothiazine as an oil.

*Example 6*

A solution of 38.7 g. of 10-[-3'-(N-formylpiperazinyl)-propyl]-2-dimethylaminophenothiazine (as prepared in Example 5) in 200 ml. of ethanol and 125 ml. of water containing 30 ml. of 40% sodium hydroxide solution is refluxed for two hours. The alcohol is removed by distillation in vacuo on a steam bath. The residue is treated with benzene-water and the dried organic layer evaporated in vacuo. The residual oil is 10-(-3'-piperazinylpropyl)-2-dimethylaminophenothiazine.

*Example 7*

A stirred suspension of 55.2 g. of 10-(-3'-piperazinylpropyl)-2-dimethylaminophenothiazine (as prepared in Example 6), 19.6 g. of β-bromoethanol and 21.6 g. of potassium carbonate in 700 ml. of toluene is refluxed under nitrogen atmosphere for six hours. Water is added to the reaction mixture and the separated toluene layer is extracted with dilute acetic acid. The acid extracts are neutralized with ammonia and extracted with benzene. The solvent is distilled in vacuo to give a residue of 10-[3'-(N-β-hydroxyethylpiperazinyl)-propyl]-2 - dimethylaminophenothiazine.

A solution of the free base in ether is treated with excess glacial acetic acid to give the acetate salt.

*Example 8*

A suspension of 20.6 g. of 10-[-3'-(N-β-hydroxyethylpiperazinyl) - propyl] - 2 - dimethylaminophenothiazine (as prepared in Example 7) in 300 ml. of benzene and 4.0 g. of acetyl chloride is reacted at room temperature for ten hours. The reaction mixture is poured into water, neutralized and extracted with benzene. A solution of the viscous oily base in 25 ml. of dry ether is treated with excess ethereal hydrogen chloride to give the hydrochloride salt of 10-[-3'-(β-acetoxyethylpiperazinyl)-propyl]-2-dimethylaminophenothiazine.

*Example 9*

A mixture of 18.4 g. of 10-(-3'-piperazinylpropyl)-2-dimethylphenothiazine (as prepared in Example 6), 8.8 g. of 2-bromo-2'-hydroxyethyl ether (prepared by treating 2,2'-dihydroxyethyl ether with one equivalent of hydrobromic acid) and 7.6 g. of potassium carbonate in 500 ml. of xylene is refluxed under nitrogen atmosphere for fifteen hours. The reaction mixture is then treated with water and the separated organic layer extracted with dilute acetic acid. The acid extracts are made basic and extracted with benzene. Evaporation of the solvent in vacuo yields 10-[-3'-(N-hydroxyethoxyethylpiperazinyl)-propyl]-2-dimethylaminophenothiazine.

Treating a solution of the free base in ethyl acetate with excess tartaric acid gives the corresponding tartrate salt.

*Example 10*

A stirred suspension of 60.5 g. of 2-dimethylaminophenothiazine (as prepared in Example 1) and 10.1 g. of sodamide in 800 ml. of xylene is refluxed under a nitrogen atmosphere and 55.6 g. of 4-bromo-1-N-pyrrolidinylbutane is added gradually. After the addition is complete, stir and heat for fourteen hours under nitrogen atmosphere. The cooled mixture is carefully treated with ice water and the separated organic layer is washed with benzene and then extracted with dilute acetic acid. The acid extracts are neutralized with sodium hydroxide solution and then ether extracted. The ether is evaporated and leaves 10-[4'-(N-pyrrolidinylbutyl)] - 2 - dimethylaminophenothiazine. The residual viscous basic oil is reacted with excess bismethylenesalicyclic acid in ethyl acetate solution yielding the corresponding bismethylenesalicylate salt.

*Example 11*

To a solution of 11 g. of 10-(-3'-piperazinylpropyl)-2-dimethylaminophenothiazine (prepared as in Example 6) in 50 ml. of dimethylformamide is added a solution of 7.5 g. of p-nitrophenethyl bromide in 10 ml. of dimethylformamide. After stirring at 95–105° C. for six hours, the solution is cooled and poured into 1500 ml. of water. The mixture is made alkaline with 10% sodium hydroxide solution and is extracted with chloroform. The combined chloroform extracts are washed with water, dried over potassium carbonate and then filtered. The solvent is removed from the filtrate to yield 10-[-3'-(p-nitrophenethylpiperazinyl) - propyl] - 2 - dimethylaminophenothiazine.

A mixture of 11.7 g. of 10-[-3'-(p-nitrophenethylpiperazinyl)-propyl]-2-dimethylaminophenothiazine dissolved in 300 ml. of warm ethanol and 0.3 g. of platinum oxide over 50 p.s.i. of hydrogen for one hour. The catalyst is filtered and washed with ethanol. The ethanol solutions are combined and the solvent is removed in vacuo on a steam bath. The residual oil is 10-[-3'-(p-aminophenethylpiperazinyl) - propyl] - 2-dimethylaminophenothiazine.

What is claimed is:
1. A chemical compound selected from the group consisting of a free base and its nontoxic, acid addition salts, the free base of the formula:

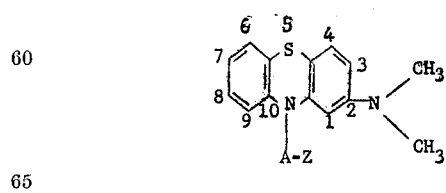

in which A is an alkylene chain having from 2 to 4 carbon atoms, separating the nitrogens to which it is attached by at least 2 carbon atoms; and Z is a member selected from the group consisting of dimethylamino, diethylamino, N-formylpiperazinyl, piperazinyl, N-methylpiperazinyl, N-hydroxyethylpiperazinyl, N-acetoxyethylpiperazinyl, N-hydroxyethoxyethylpiperazinyl, N-pyrrolidinyl, N - p - nitrophenethylpiperazinyl, N-p-aminophenethylpiperazinyl.

2. The compound of the formula:

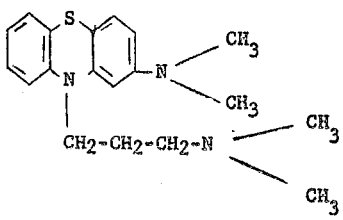

3. The compound of the formula:

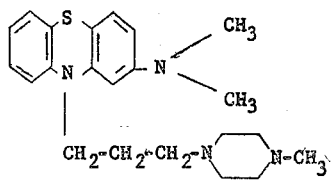

4. The compound of the formula:

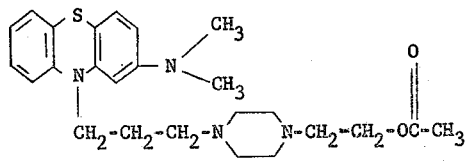

5. The compound of the formula:

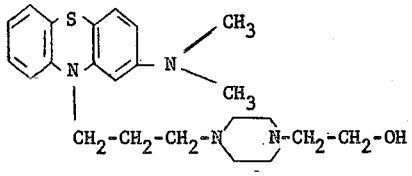

6. The compound of the formula:

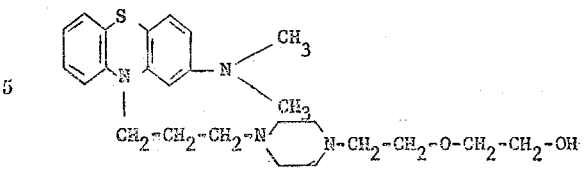

References Cited in the file of this patent

UNITED STATES PATENTS

| | | |
|---|---|---|
| 2,766,235 | Cusic | Oct. 9, 1956 |
| 2,785,160 | Jacob et al. | Mar. 12, 1957 |
| 2,830,987 | Gailliot et al. | Apr. 15, 1958 |
| 2,838,507 | Cusic | June 10, 1958 |
| 2,877,224 | Jacob | Mar. 10, 1959 |
| 2,898,336 | Gailliot et al. | Aug. 4, 1959 |
| 2,905,668 | Jacob et al. | Sept. 22, 1959 |
| 2,928,767 | Gulesich et al. | Mar. 15, 1960 |

FOREIGN PATENTS

| | | |
|---|---|---|
| 172,334 | Austria | Aug. 25, 1952 |
| 740,575 | Great Britain | Nov. 16, 1955 |
| 420,444 | Great Britain | June 2, 1932 |

OTHER REFERENCES

Beilstein: Handbuch der Organisch. Chem., vol. XXVII, p. 402 (1938).

Granick et al.: J. Am. Chem. Soc., vol. 62, pp. 1802–1803 (1940).

Granick et al.: J. of the Am. Chem. Soc., vol. 62, pages 1804 to 1810 (1940).

Massie: Chem. Reviews, vol. 54, p. 810 (1954).

Yamamoto et al.: Nara Igaku Zasshi, vol. 9, pages 365–8 (December 1, 1958).